(12) United States Patent
Cirelli et al.

(10) Patent No.: US 12,549,610 B2
(45) Date of Patent: *Feb. 10, 2026

(54) SYSTEMS AND METHODS FOR DETERMINING RISK RATINGS OF ROLES ON CLOUD COMPUTING PLATFORM

(71) Applicant: Capital One Services, LLC, McLean, VA (US)

(72) Inventors: Stephen Cirelli, Chesterfield, VA (US); Daniel Girard, Chantilly, VA (US); Ellis Hammer, Washington, DC (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,242

(22) Filed: May 30, 2024

(65) Prior Publication Data

US 2024/0323235 A1 Sep. 26, 2024

Related U.S. Application Data

(63) Continuation of application No. 18/138,802, filed on Apr. 25, 2023, now Pat. No. 12,028,381, which is a continuation of application No. 16/937,100, filed on Jul. 23, 2020, now Pat. No. 11,671,462.

(51) Int. Cl.
*H04L 9/40* (2022.01)
*G06F 16/9535* (2019.01)

(52) U.S. Cl.
CPC ........ *H04L 63/205* (2013.01); *G06F 16/9535* (2019.01); *H04L 63/105* (2013.01)

(58) Field of Classification Search
CPC ..... H04L 63/10; H04L 63/105; H04L 63/205; G06F 16/9535
See application file for complete search history.

(56) References Cited

U.S. PATENT DOCUMENTS

| | | | |
|---|---|---|---|
| 8,112,370 B2 | 2/2012 | Muppidi et al. | |
| 8,498,959 B2 | 7/2013 | Almeida et al. | |
| 8,918,387 B1 | 12/2014 | Sokolov | |

(Continued)

FOREIGN PATENT DOCUMENTS

| | | |
|---|---|---|
| EP | 2256660 A1 | 12/2010 |
| EP | 2828764 B1 | 11/2017 |
| WO | 2019195833 A1 | 10/2019 |

*Primary Examiner* — Jeong S Park
(74) *Attorney, Agent, or Firm* — HUNTON ANDREWS KURTH LLP

(57) ABSTRACT

A system is provided including a database and a server. The database stores a plurality of cloud computing service accounts created on a cloud computing platform, a plurality of roles associated with each cloud computing service account, and a plurality of policies associated with each role. The server is in data communication with the database and containing a role risk rating engine. The role risk rating engine is configured to: select a first role of the plurality of roles from the database; retrieve the plurality of policies associated with the first role; determine a risk rating for the first role based on the plurality of policies associated with the first role; store the risk rating of the first role in the database; receive a query requesting the risk rating of the first role; and in response to the query, transmit the risk rating of the first role.

20 Claims, 7 Drawing Sheets

(56) References Cited

U.S. PATENT DOCUMENTS

| | | |
|---|---|---|
| 8,918,881 B2 | 12/2014 | Bettini et al. |
| 9,055,068 B2 | 6/2015 | Bryan et al. |
| 9,229,997 B1 | 1/2016 | Raghavan et al. |
| 9,565,191 B2 | 2/2017 | Allen et al. |
| 9,661,013 B2 | 5/2017 | Reno et al. |
| 9,881,304 B2 | 1/2018 | Morrison et al. |
| 9,992,166 B2 | 6/2018 | Ji et al. |
| 10,091,195 B2 | 10/2018 | Lindemann |
| 10,162,876 B1 | 12/2018 | Raghavan et al. |
| 10,348,739 B2 | 7/2019 | Greenspan et al. |
| 10,691,822 B1 * | 6/2020 | Brandwine ............ G06F 21/604 |
| 11,100,232 B1 * | 8/2021 | Juncker ................. H04L 63/102 |
| 11,671,462 B2 * | 6/2023 | Cirelli ................... H04L 63/205 |
| | | 726/1 |
| 12,028,381 B2 * | 7/2024 | Cirelli ................... H04L 63/105 |
| 2009/0300711 A1 * | 12/2009 | Tokutani ............. G06F 21/6218 |
| | | 726/1 |
| 2010/0030890 A1 | 2/2010 | Dutta et al. |
| 2011/0145884 A1 | 6/2011 | Rivers et al. |
| 2012/0054824 A1 | 3/2012 | Furukawa |
| 2012/0237488 A1 * | 9/2012 | Dick ..................... C12Q 1/6881 |
| | | 702/19 |
| 2013/0019314 A1 | 1/2013 | Ji et al. |
| 2013/0179450 A1 | 7/2013 | Chitiveli |
| 2013/0262662 A1 | 10/2013 | McCarthy et al. |
| 2014/0196104 A1 * | 7/2014 | Chari .................... H04L 63/102 |
| | | 726/1 |
| 2015/0088773 A1 | 3/2015 | Fifield et al. |
| 2015/0200816 A1 | 7/2015 | Yung et al. |
| 2015/0350174 A1 | 12/2015 | Reno et al. |
| 2017/0004573 A1 | 1/2017 | Hussain |
| 2017/0039180 A1 * | 2/2017 | Pruitt .................... G06F 16/986 |
| 2017/0295197 A1 * | 10/2017 | Parimi .................... H04L 63/10 |
| 2018/0191730 A1 | 7/2018 | Deters et al. |
| 2018/0336361 A1 | 11/2018 | Gilani et al. |
| 2019/0018867 A1 | 1/2019 | Li et al. |
| 2019/0278935 A1 | 9/2019 | Bhuiyan et al. |
| 2019/0296978 A1 | 9/2019 | Seshadri et al. |
| 2020/0007549 A1 | 1/2020 | Gormley |
| 2020/0242536 A1 * | 7/2020 | Schwantes ............... G06F 17/16 |
| 2021/0314340 A1 * | 10/2021 | Ubriani ................. G06N 3/082 |

\* cited by examiner

|         | Probe-1 | Probe-2 | Probe-3 | Probe-4 | Probe-5 | Probe-6 | Probe-7 | Probe-8 |
|---------|---------|---------|---------|---------|---------|---------|---------|---------|
| Policy-1 | F | F | F | F | F | F | F | F |
| Policy-2 | F | F | F | F | P | P | P | P |
| Policy-3 | F | F | P | P | P | P | P | P |

SYSTEMS AND METHODS FOR DETERMINING RISK RATINGS OF ROLES ON CLOUD COMPUTING PLATFORM

CROSS REFERENCE TO RELATED APPLICATION

The subject application is a continuation of U.S. patent application Ser. No. 18/132,802 filed Apr. 25, 2023, which is a continuation of U.S. application Ser. No. 16/937,100 filed Jul. 23, 2020, now U.S. Pat. No. 11,671,462, the complete disclosures of which are incorporated herein by reference.

FIELD OF THE INVENTION

The present disclosure relates generally to cloud computing technology, and more particularly, to systems and methods for determining risk ratings of roles on cloud computing platforms.

BACKGROUND

Services and actions within services offered by cloud computing platforms are ever-changing and increasing. Documentation relevant to those services and actions could be scattered across the cloud computing platforms, which can present difficulties for users seeking to locate services and actions efficiently and effectively. For example, cloud computing platforms may have one or more documentation portals that provide lists of documentation for some or all services. The lists may comprise webpage links referring to a relevant service. A user may have to click through each of these links to research the relevant service. Following each webpage link, all of the actions associated with that service may be documented. However, this may not be cohesive, comprehensive, or an efficient organizational approach, and may result in users being unable or unwilling to research services. The services and the actions inside the services may not be provided in an easy-to-find fashion.

In addition, there are roles performing actions on the cloud computing platforms. From a cyber-security perspective, understanding the risk of each action and the risk of each role is critical for the security of computer systems using the cloud computing platforms. However, it is difficult to understand the risks of actions and roles in existing cloud computing platforms.

These and other deficiencies exist. Accordingly, there is a need to provide solutions that overcome these deficiencies to increase accessibility of services and actions inside the services offered by cloud computing platforms and to understand the risk of each action and the risk of each role.

SUMMARY

Aspects of the disclosed technology include systems and methods for determining a risk rating of a role on a cloud computing platform.

Embodiments of the present disclosure provide a system. The system can comprise: a database, the database storing a plurality of cloud computing service accounts created on a cloud computing platform, a plurality of roles associated with each account of the plurality of cloud computing service accounts, and a plurality of policies associated with each role of the plurality of roles; and a server in data communication with the database and containing a role risk rating engine. The role risk rating engine is configured to: select a first role of the plurality of roles from the database; retrieve the plurality of policies associated with the first role from the database; determine a risk rating for the first role based on the plurality of policies associated with the first role; store the risk rating of the first role in the database; receive via the database a query requesting the risk rating of the first role; and in response to the query, transmit the risk rating of the first role.

Embodiments of the present disclosure provide a server. The server comprises: a memory; a display; a processor coupled to the memory and the display; and a role risk rating engine. The server is in data communication with a database, the database contains a plurality of cloud computing service accounts created on a cloud computing platform, a plurality of roles associated with each account of the plurality of cloud computing service accounts, and a plurality of policies associated with each role of the plurality of roles. The role risk rating engine which, when executed by the processor, causes the processor to: select a first role of the plurality of roles from the database; retrieve the plurality of policies associated with the first role from the database; determine a risk rating for the first role based on the plurality of policies associated with the first role; store the risk rating of the first role in the database; receive via the database a query requesting the risk rating of the first role; and in response to the query, transmit the risk rating of the first role.

Embodiments of the present disclosure provide a method. The method comprises: selecting, by a role risk rating engine deployed on a server, a role of a plurality of roles from a database. The plurality of roles are stored within the database, and the he server is in data communication with the database. The database stores a plurality of cloud computing service accounts created on a cloud computing platform, and the plurality of roles are associated with each account of the plurality of cloud computing service accounts. The database also stores a plurality of policies associated with each role of the plurality of roles. The method further comprises retrieving, by the role risk rating engine, the plurality of policies associated with the role from the database; determining, by the role risk rating engine, a risk rating for the role based on the plurality of policies associated with the first role; storing, by the role risk rating engine, the risk rating of the role in the database; receiving, by the database, a query requesting the risk rating of the role; and in response to the query, transmitting, by the role risk rating engine, the risk rating of the role being assessed.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

FIG. 6 is a diagram of showing probe results under different policies according to an example embodiment.

DETAILED DESCRIPTION OF EXAMPLE EMBODIMENTS

Figure 1:
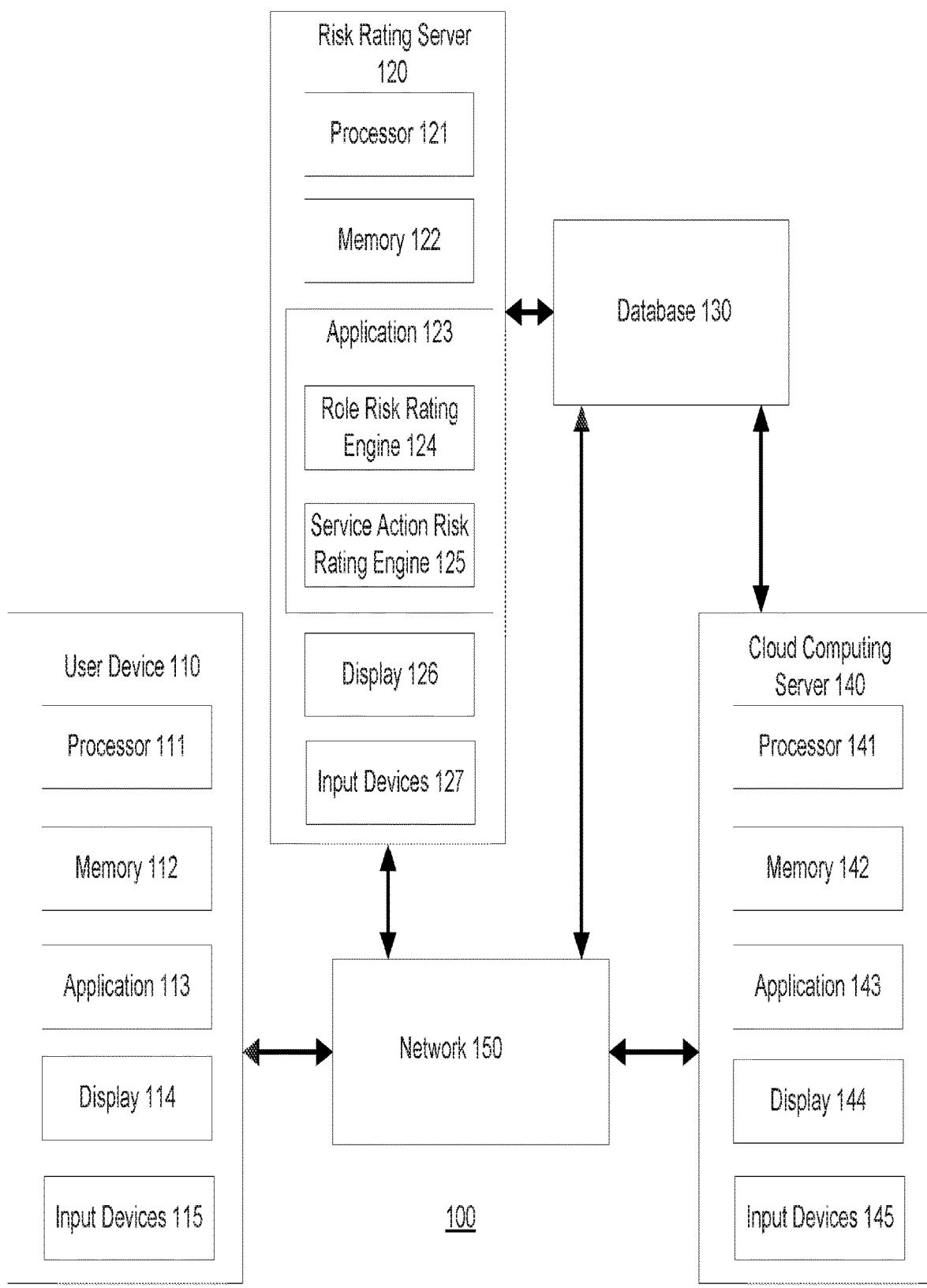
FIG. 1 is a diagram of a system for determining a risk rating of a role of a cloud computing platform according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the presentation disclose systems and methods for determining and listing a risk rating for a role in a cloud computing service account on a cloud computing platform. The disclosed systems and methods may also list all services and all actions for each service offered by the cloud computing platform. The disclosed systems and methods may further provide a risk rating for each action.

Specifically, the systems and methods disclosed herein can provide an aggregate listing of services and associated policies for a cloud computing service account on a cloud computing platform and determine a risk rating for one or more roles within the cloud computing service account based on the policies attached to the role(s) using probes. The probes can determine whether a role is allowed or denied to access each service action of a determined number of service actions associated with each probe. According to the policies, if the role is allowed to access a service action, then the risk score of that service action can be summed into the risk score of the probe. The risk score of the role can be a sum of all the risk scores of all the probes. Then the risk rating of the role can be determined by dividing the risk score of the role by the total risk score of all the service actions associated with all the probes to create a numerical representation. For example, the risk rating may be a number ranging from 0 to 100. A risk rating of 0 can indicate the role has a minimal risk, and a risk rating of 100 can indicate the role has a maximum risk.

The present disclosure makes reference to the Amazon Web Services® (AWS) cloud computing platform. However, the present disclosure is not limited to AWS, and could be applied to other cloud computing platforms including, without limitation, Google Cloud Platform®, Microsoft Azure®, IBM Bluemix®, and Alibaba Cloud®.

As used herein, a cloud computing service account can be managed by a management web service that helps securely control access to cloud computing platform resources, for example, services provided by the platform and service actions of the services. The management web service can be used to control who is authenticated (signed in) and authorized (has permissions) to use resources.

The cloud computing service account can be a root user account and/or a management web service user account. The management web service may be an identity and access management (IAM) service on AWS, for example. When a management web service account is first created, a single sign-in identity is generated that has complete access to all cloud computing services and resources in the account. This identity is called the management web service account root user (herein referred to as a root user account) and is accessed by signing in with the email address and password that is used to create the account. The root user account may then be used to create one or more management web service user accounts. The root user account may be securely locked away and may be used to perform only a few account and service management tasks.

The management web service user accounts may be granted permission to administer and use resources in the management web service root user account. Different permissions may be granted to different management web service user accounts for different resources. For example, on AWS, some IAM user accounts may be allowed to complete access to Amazon Elastic Compute Cloud (Amazon EC2), Amazon Simple Storage Service (Amazon S3), Amazon DynamoDB, Amazon Redshift, and other AWS services. Other IAM user accounts may be allow read-only access to just some S3 buckets, or permission to administer just some EC2 instances, or to access billing information but nothing else.

The services offered by a cloud computing platform may comprise compute services; storage services; database services; security, identity, and compliance services; machine learning services; and so forth. For example, the AWS services may be grouped by their AWS product categories and include information about what IAM features they support. A service may be selected to view the AWS documentation about IAM authorization and access for that service.

A role is a management web service identity that is created in the cloud computing service account that has specific permissions. For example, a role may be an IAM identity on the AWS. A role can be associated with permission policies that determine what the role can and cannot do in a cloud computing platform. A role can be assumable by anyone who needs it. When a role is assumed, temporary security credentials may be provided for the role session.

Roles can be used to delegate access to users, applications, or services that do not normally have access to cloud computing platform resources. For example, users in the management web service account may desire to be granted access to resources they do not usually have, or users in one management web service account may desire to be granted access to resources in another management web service account. Or, access to a management web service account may be desired to grant to third parties. For these scenarios, access to the cloud computing platform resources can be delegated using a role.

Roles can be used by the following: a management web service user in the same management web service account as the role; a management web service user in a different management web service account than the role; a web service offered by the cloud computing platform, such as Amazon EC2 on the AWS; an external user authenticated by an external identity provider (IdP) service on the AWS; a custom-built identity broker on the AWS; and so forth.

An example of a role can be an AWS service role, which is a role that a service assumes to perform actions in an AWS account on behalf of a user of the AWS account. When some AWS service environments are set up, a role for the service to assume may be defined. This service role may include all the permissions required for the service to access the AWS resources that it needs. Service roles can provide access only within that AWS account and cannot be used to grant access to services in other accounts. A service role may be created, modified, and deleted from within IAM.

For example, an AWS service role for an EC2 can be an example of a service role. A special type of service role that an application running on an Amazon EC2 instance can assume to perform actions in an AWS account. This role is assigned to the EC2 instance when it is launched. Applications running on that instance can retrieve temporary security credentials and perform actions that the role allows.

Another example of a role can be an AWS service-linked role, which is a unique type of service role that is linked directly to an AWS service. Service-linked roles are predefined by the service and include all the permissions that the service requires to call other AWS services.

Access to resources on a cloud computing platform can be managed by creating policies and attaching them to identities (users, groups of users, or roles) or resources. A policy may be an object in the cloud computing platform that, when associated with an identity or resource, defines their permissions. For example, AWS evaluates these policies when an IAM principal (user or role) makes a request. Permissions in the policies determine whether the request is allowed or denied. Policies may be defined in a standardized data format, such as a JavaScript Object Notation (JSON), Extensible Markup Language (XML), Standardized Generalized Markup Language (SGML), Hypertext Markup Language (HTML), or other formats.

The policies can define permissions for an action regardless of the method that is used to perform the operation. For example, on AWS, if a policy allows the GetUser action, then a user with that policy can get user information from the AWS Management Console, the AWS command line interface (CLI), or the AWS application programming interface (API).

Some example policies may include identity-based policies, resource-based policies, organizations service control policies (SCPs), access control lists (ACLs), and session policies.

Identity-based policies are JSON policy documents used to set permissions boundaries and attached to identities (users, groups to which users belong, or roles). Identity-based policies grant permissions to an identity.

Resource-based policies are JSON policy documents that attach to a resource. Examples of resource-based policies are Amazon S3 bucket policies and IAM role trust policies. Resource-based policies grant permissions to the principal that is specified in the policy. Principals can be in the same account as the resource or in other accounts.

Organizations SCPs can define the maximum permissions for account members of an organization or organizational unit (OU). SCPs limit permissions that identity-based policies or resource-based policies grant to entities (users or roles) within the account.

Access control lists (ACLs) are used to control which principals in other accounts can access the resource to which the ACL is attached. ACLs are cross-account permissions policies that grant permissions to the specified principal.

Session policies are JSON policies that are provided when a role or federated user session is assumed. Session policies limit the permissions that the role or user's identity-based policies grant to the session.

Embodiments of the present disclosure may provide several advantages. For example, a comprehensive tool can be provided to determine the level of power a role has within a cloud computing account. Further, a native API can be leveraged to provide a level understanding of the rights and power a role has within an account. This capability can provide a rapid understanding of those roles that have power within a cloud computing service account. This can also allow for the prioritization of alarming and monitoring of those roles within the cloud computing service account. This can further provide an auditing capability to assess the level of rights a role has within the cloud computing service account. This can also provide the ability to track risk reporting and uniformity across the cloud computing service account.

Embodiments of the present disclosure can also provide for listings of a service and a service action upon receiving a query of the service and the service action, so that a user may avoid going through a myriad of webpage links to locate the service and the service action, and instead information can be located more efficiently and effectively.

Embodiments of the present disclosure can further determine and list a risk rating for each action. By doing so, so that the risk level of accessing an action can be evaluated.

FIG. 1 illustrates a system 100 for determining and listing a risk rating of a role of a cloud computing service account according to an example embodiment. As further discussed below, the system 100 may include a user device 110, a risk rating server 120, a database 130, and a cloud computing server 140 in communication using a network 150. Although FIG. 1 illustrates single instances of the components, the system 100 may include any number of components.

The user device 110 can be configured to present to a user a user interface from which the user may log into, for example, the database 130 and/or the risk rating server 120 to request risk ratings of roles and/or inquire about services and service actions. The user device 110 may be configured to display on the user interface the risk ratings of roles and/or the services and service actions when the database 130 transmits to the user device 110 the risk ratings of roles and/or the services and service in response to the request and/or the inquiry.

The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, an application 113, a display 114, and input devices 115. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as application 113, and other data, such as private and personal information.

The application 113 may comprise one or more software applications comprising instructions for execution on the user device 110. In some examples, the user device 110 may execute one or more applications, such as software applications, that enable, for example, network communications with one or more components of the system 100, transmit and/or receive data, and perform the functions described herein such as presenting risk ratings of roles and/or services and service actions to a user of the user device 110. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein such as entering requests for risk ratings of roles and inquiries about services and service actions.

The risk rating server 120 can be configured to determine risk ratings of roles and/or risk ratings of service actions. The risk ratings of roles may be determined based on policies attached to the roles that are stored in the database 130. The risk rating server 120 may also be configured to receive requests or inquiries about risking ratings of roles and service actions, and to transmit the risking ratings of roles and service actions in response to the requests or inquiries.

The risk rating server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The risk rating server 120 may include a processor 121, a memory 122, and an application 123. The processor 121 may be a processor, a microprocessor, or other processor, and the risk rating server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the risk rating server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as risk ratings of roles and risk ratings of service actions.

The application 123 may comprise one or more software applications, such as role risk rating engine 124 and service action risk rating engine 125, comprising instructions for execution on the risk rating server 120. In some examples, the risk rating server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the role risk rating engine 124 of the application 123 may be executed to obtain policies attached to roles and determine risk ratings of the roles based on the policies; service action risk rating engine 125 of the application 123 may be executed to determine risk ratings of service actions. Such processes may be implemented in software, such as software modules, for execution by computers or other machines. The application 123 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The risk rating server 120 may further include a display 126 and input devices 127. The display 126 may be any type of device for presenting visual information such as a computer monitor, a flat panel display, and a mobile device screen, including liquid crystal displays, light-emitting diode displays, plasma panels, and cathode ray tube displays. The input devices 127 may include any device for entering information into the risk rating server 120 that is available and supported by the risk rating server 120, such as a touch-screen, keyboard, mouse, cursor-control device, touch-screen, microphone, digital camera, video recorder or camcorder. These devices may be used to enter information and interact with the software and other devices described herein.

The database 130 may be configured to receive and store cloud computing service accounts, roles in the cloud computing service accounts, and policies attached to the roles. The database 130 can be configured to store risking ratings of the roles and service actions. The database 130 may also be configured to receive requests or inquiries about risking ratings of roles and service actions, and to transmit or list the risking ratings of roles and service actions in response to the requests or inquiries. The database 130 can also be configured to receive requests or inquiries about services and service actions, and to transmit or list the services and service actions in response to the requests or inquiries.

The database 130 may be one or more databases. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the risk rating server 120, internally by the cloud computing server 140, or may be hosted externally of the risk rating server 120 and the cloud computing server 140, such as by a third-party server, by a third-party cloud-based platform, or in any storage device that is in data communication with the risk rating server 120 and/or the cloud computing server 140.

The cloud computing server 140 may be, for example, an AWS server on which a plurality of cloud computing service accounts are created, roles of the cloud computing service accounts are stored, and policies associated with the roles are stored. The cloud computing server 140 also contains services and services actions of the AWS.

The cloud computing server 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The cloud computing server 140 may include a processor 141, a memory 142, and an application 143. The processor 141 may be a processor, a microprocessor, or other processor, and the cloud computing server 140 may include one or more of these processors. The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and the cloud computing server 140 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 142 may be configured to store one or more software applications, such as the application 143, and other data, such as the cloud computing service account information.

The application 143 may comprise one or more software applications comprising instructions for execution on the cloud computing server 140. In some examples, the cloud computing server 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. For example, the application 143 may be executed to perform generating one or more cloud computing service accounts, storing services and service actions, generating role policies, attaching policies to roles, and transmitting roles and policies to the database 130. Such processes may be implemented in software, such as software modules, for execution by computers or other machines. The application 143 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The cloud computing server 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include any device for entering information into the cloud computing server 140 that is available and supported by the cloud computing server 140, such as a touch-screen, keyboard, mouse, cursor-control device, touch-screen, microphone, digital camera, video recorder or camcorder. These devices may be used to enter information and interact with the software and other devices described herein.

The system 100 may include one or more networks 150. In some examples, the network 150 may be one or more of a wireless network, a wired network or any combination of wireless network and wired network, and may be configured to connect the user device 110, the risk rating server 120, the database 130, and the cloud computing server 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the user device 110, risk rating server 120, and cloud computing server 140 using the network 150 can occur using one or more front channels and one or more secure back channels. A front channel may be a communication protocol that employs a publicly accessible and/or unsecured communication channel such that a communication sent to the user device 110, risk rating server 120, and/or cloud computing server 140 may originate from any other device, whether known or unknown to the user device 110, risk rating server 120, and/or cloud computing server 140, if that device possesses the address (e.g., network address, Internet Protocol (IP) address) of the user device 110, risk rating server 120, and/or cloud computing server 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the user device 110, risk rating server 120, and/or cloud computing server 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

In some examples, the user device 110 can be associated with a user and may be operated by that user, such as a user authorized to log into the risk rating server 120, the database 130 and/or the cloud computing server 140. The risk rating server 120 can be associated with a financial institution, such as a bank or a credit card company that offers listing services of the cloud computing server 140, service actions of the services, policies, risk ratings of roles, and/or risk rating of the service actions to the user of the user device 110. The cloud computing server 140 can be associated with a cloud computing platform on which the user of the user device 110 may perform cloud computing development activities, and may be operated by that cloud computing platform.

Figure 2:
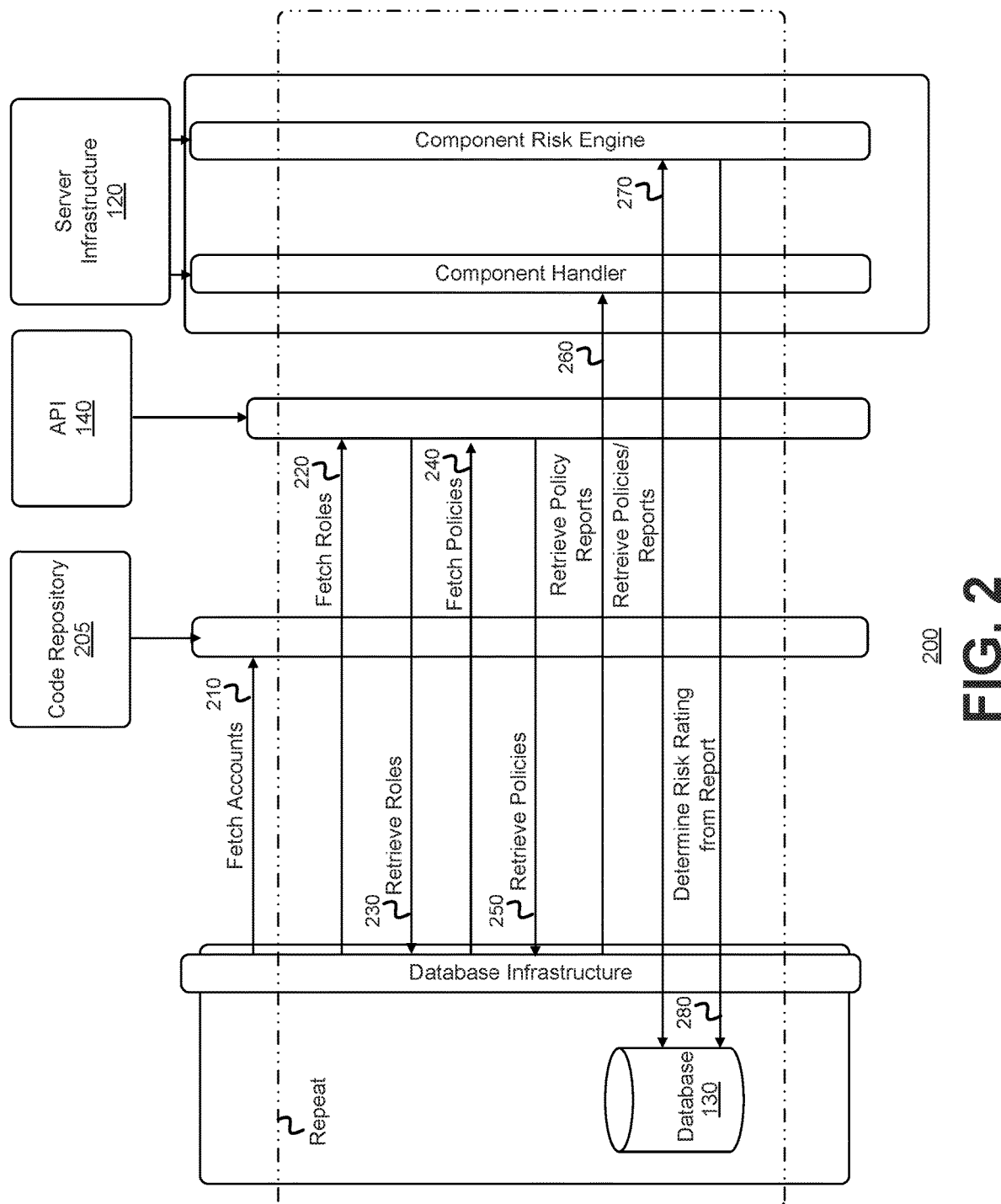
FIG. 2 is a sequence flow diagram for determining a risk rating of a role of a cloud computing platform according to an example embodiment.

FIG. 2 illustrates a sequence flow diagram 200 of determining and listing risk ratings of roles according to an example embodiment. The sequence flow diagram 200 may be implemented in the system 100 of FIG. 1. FIG. 2 may reference the same or similar components as those illustrated in FIG. 1, including a user device, a risk rating server, a database, and a cloud computing server.

In step 210, a database infrastructure (e.g., which may be part of the risk rating server 120 infrastructure), fetches information of one or more cloud computing service accounts from a code repository 205. The database infrastructure may comprise one or more computers and the database 130. The one or more cloud computing service accounts are created on the cloud computing server 140. The information of the one or more cloud computing service accounts may comprise login credentials such as user names and passwords that are used to log into the cloud computing server 140. The code repository 205 may be hosted on GitHub® or another accessible storage location.

In step 220, the database infrastructure fetches roles of the one or more cloud computing service accounts from the cloud computing server 140. The database infrastructure may use the information of the one or more cloud computing service accounts to log into the cloud computing server 140. The database infrastructure may access application programming interfaces (APIs) offered by the cloud computing server 140 (which is represented as API 140 in FIG. 2) to fetch the roles.

In step 230, the database infrastructure receives the roles of the one or more cloud computing service accounts from the cloud computing server 140. The database infrastructure may store the roles of the one or more cloud computing service accounts in the database 130.

In step 240, the database infrastructure fetches policies associated with the roles of the one or more cloud computing service accounts from the cloud computing server 140. One or more policies may be attached to each role, which specify what resources of the cloud computing server 140 are accessible to that role and/or what resources of the cloud computing server 140 are not accessible to that role. The database infrastructure may access the APIs of the cloud computing server 140 to fetch the policies. One cloud computing service account can have hundreds of roles, and policies that are attachable to a role can be in the hundreds per account.

In step 250, the database infrastructure receives the policies associated with the roles of the one or more cloud computing service accounts from the cloud computing server 140. The database infrastructure may store the policies of the roles in the database 130.

In step 260, a component handler of the risk rating server 120 retrieves policy reports as a JSON structure from the database infrastructure. The component handler of the risk rating server 120 may be a software module or application, a hardware module, or a combination thereof. The component handler may be implemented in the application 123 of the risk rating server 120. The component handler may be configured and/or executed to perform indexing the services of the cloud computing server 140, service actions of the services, roles and policies. The component handler may also be configured and/or executed to perform transmitting and listing the services of the cloud computing sever 140, service actions of the services, roles and policies to the user device 110 when a query about the services of the cloud computing sever 140, service actions of the services, roles and policies is received from the user device 110. For example, the component handler may print out all the actions that S3 provides, all policies in a JSON layout, etc. The component handler may also list in a single line a service and its action capability. In this way, a lookup service inside of a cloud computing platform can be provided for every service and every action therein. So a user does not need to go through multiple linking of multiple pages and/or having to write some kind of HTML ripper in order to locate a cloud computing service and its actions. Further, the component handler can be configured to synchronize with the cloud computing server 140, which indicates that whenever a new service and/or a new service action is rolled out by the cloud computing server 140, the component handler can list or print out the new service and/or the new service action upon receiving an query about the new service and/or the new service action.

In step 270, the component risk engine of the risk rating server 120 may communicate with the database 130 to retrieve the policies/reports stored in the database 130. The component risk engine herein may comprise the role risk rating engine 124 and the service action risk rating engine 125 in FIG. 1. The component risk engine can be configured to determine, based on the policies/reports, a risk rating or score for each service action, and a risk rating or level for each role, details of which will be described later in this disclosure. The component risk engine may also be configured and/or executed to perform transmitting and listing the risk scores of the service actions and/or the risk ratings of the roles to the user device 110 when an inquiry about the risk scores of the service actions and/or the risk ratings of the roles is received from the user device 110.

In step 280, after determining the risk ratings of the service actions and the roles, the component risk engine transmits the risk scores of the service actions and/or the risk ratings of the roles to the database 130 in which the risk scores of the service actions and/or the risk ratings of the roles are stored. The database 130 may be configured to transmit and list the services of the cloud computing sever 140, service actions of the services, roles and policies to the user device 110 when an inquiry about the services of the cloud computing sever 140, service actions of the services, roles and policies is received from the user device 110. The database 130 may also be configured to transmit and list the risk scores of the service actions and/or the risk ratings of the roles to the user device 110 when an inquiry about the risk scores of the service actions and/or the risk ratings of the roles is received from the user device 110.

The steps 220-280 in FIG. 2 can be performed repeatedly. For example, whenever there have a new cloud computing service account is created with the cloud computing server 140, or whenever the cloud computing server 140 offers new cloud computing services and/or new service actions, the steps in FIG. 2 can be carried out.

Figure 3:
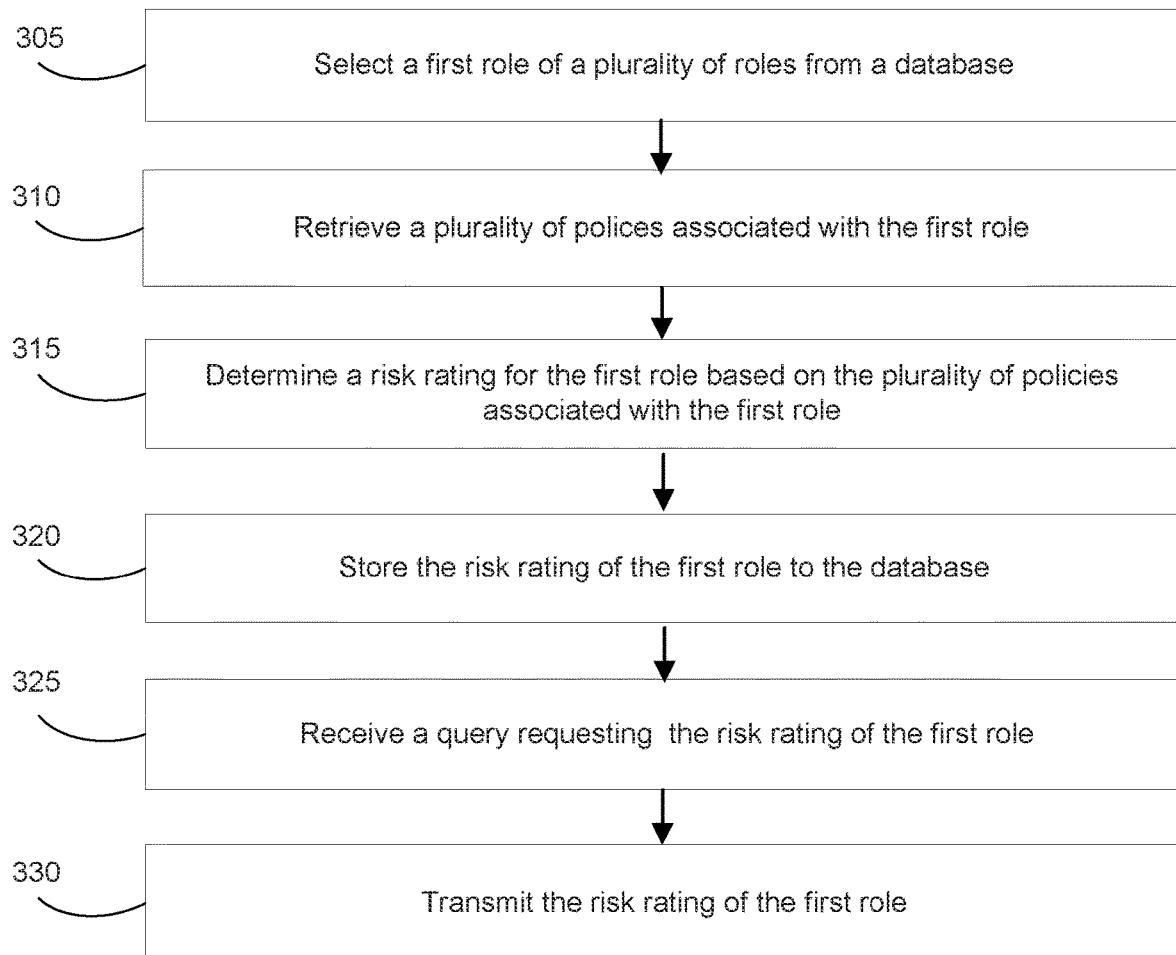
FIG. 3 is a flow chart illustrating a method of determining a risk rating of a role of a cloud computing platform according to an example embodiment.

FIG. 3 illustrates a flow chart of a method 300 of determining and listing risk ratings of roles according to an example embodiment of the present disclosure. The method 300 may be implemented in the system 100 of FIG. 1. FIG. 3 may reference the same or similar components as those illustrated in FIGS. 1 and 2, including a user device, a risk rating server, a database, and a cloud computing server. The method 300 may comprise the following steps.

In step 305, the risk rating server 120 may retrieve and select a first role of a plurality of roles from the database 130. The database 130 can contain a plurality of cloud computing service accounts created on a cloud computing platform (e.g., AWS), a plurality of roles associated with each account of the plurality of cloud computing service accounts, and a plurality of policies associated with each role of the plurality of roles. As described above, a role can be assumed by a cloud computer service account user, an application, or a service of the cloud computing sever 140. The plurality of roles may comprise at least one type of role selected from the group of a service role and a service-linked role.

In step 310, the risk rating server 120 may retrieve a plurality of polices associated with the first role from the database 130. One or more policies can be attached to the first role, which stipulate what resources of the cloud computing server 140 the first role can access and/or cannot access. That is, the plurality of policies determine permissions of the first role to access resources of the cloud computing platform (e.g., AWS).

The plurality of policies may comprise at least one type of policy selected from the group of identity-based policies, resource-based policies, permissions boundaries, organizations service control policies (SCPs), access control lists (ACLs), and session policies. Each of the plurality policies may be implemented in a policy JSON document. Each role may be limited to association with a maximum number of policies (e.g., 10 policies).

In step 315, the role risk rating engine 124 of the risk rating server 120 determines a risk rating for the first role based on the plurality of policies associated with the first role. This can creates an approximation of a role's relative risk. For example, roles with access to more AWS resources are assigned a higher risk rating/score than those with less access. Details of this step will be described below in FIG. 4.

In step 320, after determining the risk rating of the first role, the risk rating of the first role may be transmitted by the risk rating server 120 to the database 130. The risk rating of the first role can then be stored in the database 130. In some embodiments, the risk rating of the first role may also be stored in the memory 122 of the risk rating server 120.

In step 325, the database 130 may receive a query requesting the risk rating of the first role, for example, from the user device 110. For example, a user of the user device 110 may transmit the query to the database infrastructure in FIG. 2 which may communicate the query with the database 130. The user of the user device 110 may also transmit the query to the risk rating server 120 which may or may not communicate the query with the database 130.

In step 330, in response to the query, the risk rating of the first role is transmitted, for example, to the user device 110. In a case where the database infrastructure in FIG. 2 receives the query, the database infrastructure can retrieve the risk rating of the first role from the database 130, and then transmit the risk rating of the first role to the user device 110. In a case where in the risk rating server 120 receives the query, the risk rating server 120 may retrieve the risk rating of the first role from the memory 122 and then transmit the risk rating of the first role to the user device 110. The risk rating server 120 can also communicate the query with the database 130 from which the risk rating server 120 retrieves the risk rating of the first role from the memory 122 and then transmits the risk rating of the first role to the user device 110. The user device 110 can present on the display 114 the risk rating of the first role to the user of the user device 110.

In some embodiments, the method 300 may further comprise listing, by the risk rating server 120 in data communication with the database 130, services of the cloud computing platform, service actions of the services, roles, policies, and/or risking scores of service actions, when the risk rating server 120 receives from the user device 110 a query about the services of the cloud computing platform, the service actions of the services, the roles, the policies, and/or the risking scores of service actions. For example, if a user of the user device 110 wants to look for a certain service that may have a name containing "data" in it, the user can do that with a simple query, for example, requesting the risk rating server 120 to fetch all the service names and then leveraging Unix and Linux tooling to filter out certain key words the user would want. In this way, the user can dive into that certain service.

Figure 4:
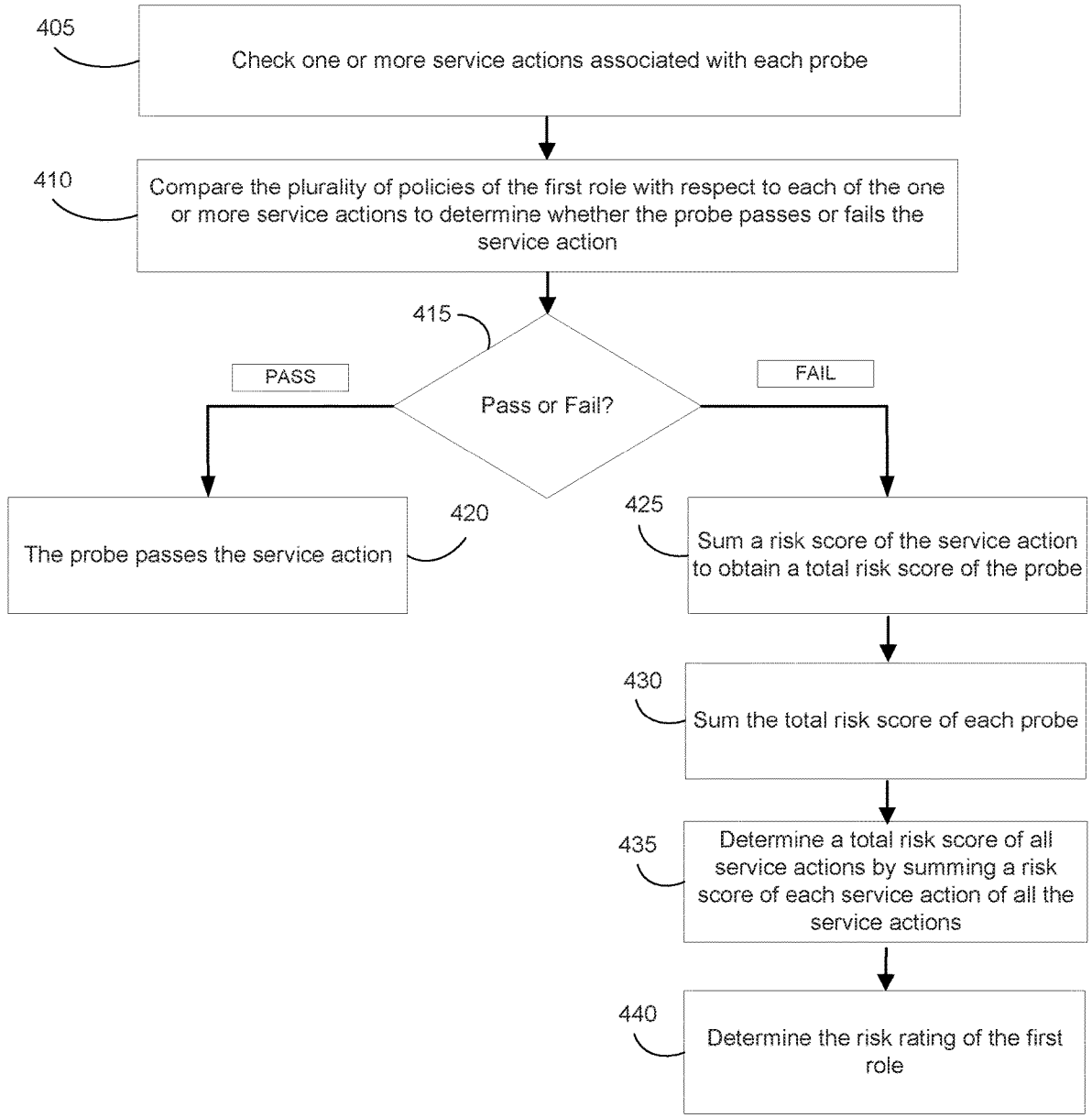
FIG. 4 is a flow chart illustrating a method of determining a risk rating of a role of a cloud computing platform according to an example embodiment.

FIG. 4 illustrates a flow chart of a method 400 of determining risk ratings of roles according to an example embodiment of the present disclosure. The method 400 may be implemented in the system 100 of FIG. 1 and/or in the step 315 of FIG. 3. FIG. 4 may reference the same or similar components as those illustrated in FIGS. 1-3, including a user device, a risk rating server, a database, and a cloud computing server. The method 400 may comprise the following steps.

In step 405, the role risk rating engine 124 of the risk rating server 120 checks, via each of a plurality of probes, one or more service actions associated with each of the plurality of probes. As used herein, each of the plurality of probes may leverage satisfiability modulo theories (SMT) to reason through JSON policy documents. Each probe can take the JSON policy documents as inputs and then be inquired about the policies. For example, when a probe is loaded with a policy, the probe can be inquired whether the policy allows a role to which the policy is attached to access a specific resource of the cloud computing platform. The probe may respond with a true statement (i.e., this policy allows the role to access the specific resource) or with a false statement (i.e., this policy does not allow the role to access the specific resource). In this example embodiment, the plurality of probes are sued to check how risky the one or more service actions are. Each of the one or more service action has its own risk rating/score. The response from a probe can provide an understanding on what is capable from that policy. In this way, a user can investigate a service of the cloud computing platform and see not only how many API calls (i.e., service actions) are in that service but also how risky each of those calls are.

Each probe may have a determined number of service actions associated with it that it checks for, such as S3:ListBuckets, EC2:TerminateInstances, etc. Constraints may be added to check for all high level resource access which can make the risk rating/score of the role more comprehensive and aware. For example, a probe may check if a role has access to all S3 actions such as ListBuckets, DeleteBuckets, etc.

In step 410, the role risk rating engine 124 of the risk rating server 120 may compare the plurality of policies of the first role with respect to each of the one or more service actions to determine whether the probe fails or passes the service action. When a probe checks each service action, the probe fails the service action if a policy associated with the role allows the role to access the service action; and the probe passes the service action if the policy associated with the role does not allow the role to access the service action. That is, each policy has its own set of probe results—each one having a pass or fail determination.

In step 415, the probe is determined to whether fail or pass the service action based on cross comparison of the plurality of policies.

In step 420, the probe passes the service action (i.e., the "PASS" branch is selected). Accordingly, the role risk rating engine 124 of the risk rating server 120 does not sum a risk score of the service action to obtain a total risk score of the probe. That is, the risk score of the service action is removed from, or not counted in, the total risk score of the probe.

In step 425, the probe fails the service action (i.e., the "FAIL" branch is selected). The role risk rating engine 124 of the risk rating server 120 sums a risk score of the service action to obtain a total risk score of the probe. Each service action has its own risk score, for example, ranging from 2 (low risk)-10 (critical risk), which may be determined by the service action risk rating engine 125 of the risk rating server 120. Specifically, this can be determined by a library (which is an example rating system) to classify each service action by its risk level. Service actions are classified by a rating system that, for the vast majority of actions, uses pattern matching in order to determine the rating. The pattern matching algorithm matches the initial verb of the service action (all service actions begin with a verb) to a set of predetermined verbs that have been bucketed into the risk levels of "Critical", "High", "Medium-High", "Medium", and "Low." Each level has a numerical risk score ranging from 2-10, increasing by 2 for each level, where "Critical" is assigned 10 and "Low" is assigned 2, and so for those in between. For example, the verbs "Terminate", "Delete", and "Detach" are associated with actions that could critically damage existing cloud infrastructure, and thus are classified in the "Critical" category of the risk buckets and given a rating of 10. As such, a service action called "TerminateInstance" would receive a critical risk rating of 10. The algorithm increases the risk rating of a service action by 2 points, up to the maximum of 10, if said service action contains the word "Config" or "Configuration" as it was determined that any service action that made configuration changes carried increased risk. There are also some service actions that carry a risk that cannot be pattern matched due to a higher or lower perceived risk than their initial verb would indicate and thus are assigned a different risk level. For example, a service action to List resources is rated as having a lower risk than a service action to Delete resources. These ratings may be added with the use of the separate service action risk rating software library included in the service action risk rating engine 125. Herein the service action risk rating software library is an example rating system and may be the same as or similar to the library mentioned above.

Each probe is weighted by the service actions it checks. If a probe fails a service action, that is, the service action is allowed to be performed by the role based on a policy JSON document attached to that role, the rating score of that service action will be summed into a total risk score of the probe. If a probe passes a service action, that is, the service action is not allowed to be performed by the role based on a policy JSON document attached to that role, the rating score of that service action will be not counted into the total risk score of the probe.

As described above, each probe may have a determined number of service actions associated with it that it checks for. So, one probe may only check access for one service action, such as CloudWatch:ListLogs, while another probe may check for one hundred service actions, for example. The overall risk score (i.e., the total risk score) of each probe is a sum of the risk scores of the service actions that make it up, and that creates the weight. For example, one probe might have a total risk score of 400 while another probe with fewer service actions might have a total risk score of 45. So a probe with fewer service actions is typically less risky than a probe with many service actions. This makes up the weighting of each probe, so a probe with more service actions can make up a larger portion of the overall role risk score of the role (i.e., a risk score of the role).

In step 430, the role risk rating engine 124 sums the total risk score of the probe for each of the plurality of probes to obtain the risk score of the first role. The risk score of the first role is a sum of the total scores of the plurality probes. For example, in this example embodiment, there may have a total of 8 probes that are factored into the risk score of the first role.

In step 435, the role risk rating engine 124 determines a total risk score of all service actions by summing a risk score of each service action of all the service actions. All the service actions comprise all the one or more service actions associated with each of the plurality of probes. That is, all the service actions include the service actions failed by the plurality of probes and the service actions passed by the plurality of probes.

In step 440, the role risk rating engine 124 determines the risk rating of the first role by dividing the risk score of the first role by the total risk score of all the service actions to create a numerical representation. For example, the risk rating of the first role may range from 0 to 1, where 0 indicates a risk rating of "no risk" and 1 indicates a risk rating of "maximum risk". As another example, the risk rating of the first role can also be defined as a number from 0 to 100 by further multiplying the division by 100 (i.e., the division obtained by dividing the risk score of the first role by the total risk score of all the service actions), where 0 indicates a risk rating of "no risk" and 100 indicates a risk rating of "maximum risk". As another example, the risk rating of the first role can also be defined in other forms by manipulating the division, for example, a percentage form. This can create an approximation of a role's relative risk. Roles with access to more cloud computing resources are assigned a higher risk score/rating than those with less access.

In some embodiments, the role risk rating engine 124 of the risk rating server 120 may further be configured or executed to generate a logo displayed next to the first role. The logo can be configured to indicate a risk rating of the first role that is one selected from the group of a low risk, a medium risk, and a high risk. The logo may be a colored logo indicating the risk rating of the first role, for example, a green color indicating a low risk that may correspond to a range of risk rating of the first role from 0 to 35, a yellow color indicating a middle risk that may correspond to a range of risk rating of the first role from 36 to 70, and a red color indicating a high risk that may correspond to a range of risk rating of the first role from 71 to 100.

According to the above, a comprehensive tool can be provided to determine the level of power a role has within a cloud computing service account. This capability can provide a rapid understanding of those roles that have power to have affect within a cloud computing service account. This can also provide the capability to prioritize the alarming and monitoring of those roles within the cloud computing service account. This can further provide an auditable capability to assess the level of rights a role has within the cloud computing service account. This can also provide the ability to track risk reporting and uniformity across the cloud computing service account.

As described above, each role has one or more policies attached to it. Without any policies attached, a role is powerless and has no access to any resources of the cloud computing platform. Policies have different accesses that are determined by their policy JSON documents. The combination of the policies determines what the role has access to. For example, if one policy has an ALLOW of the S3:ListBuckets action, but another policy has a specific DENY of the same action (the S3:ListBuckets action), the DENY policy can supersede the other, and the role will not have access to the S3:ListBuckets action. A role can have up to 10 policies attached. The method and system disclosed herein can take this into account, which integrates and compares the various policies, using their probes to check whether the probes pass or fail the various policies, to understand what the role has access to, and then scores it accordingly.

Figure 5:
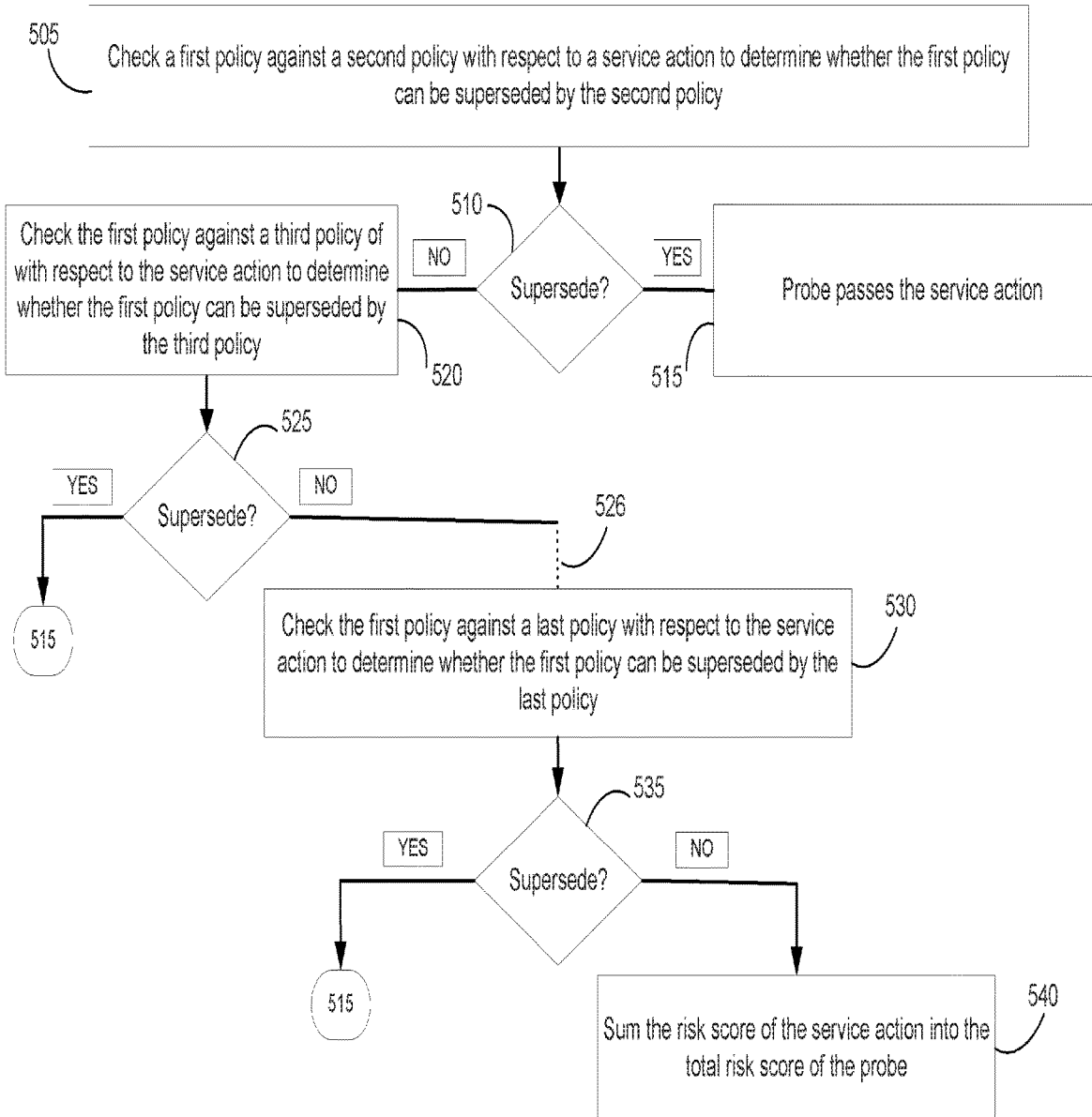
FIG. 5 is a flow chart illustrating a method of policy superseding according to an example embodiment.

FIG. 5 illustrates an example method 500 of superseding policies when more than one policies are associated with a role during determining whether a probe fails or passes a service action according to an embodiment. The method 500 may be implemented in the system 100 of FIG. 1 and/or in the step 410 of FIG. 4. FIG. 5 may reference the same or similar components as those illustrated in FIGS. 1-4, including a user device, a risk rating server, a database, and a cloud computing server. The method 500 may comprise the following steps.

In step 505, a first policy of a plurality of policies is checked by the role risk rating engine 124 against a second policy of the plurality of policies with respect to a service action to determine whether the first policy can be superseded by the second policy. The plurality of policies are attached to a role to specify whether the role is allowed to perform the service action. Each of the plurality of policies can independently grant or deny performing the service action by the role.

In step 510, whether the first policy can be superseded by the second policy is determined by the role risk rating engine 124. The first policy is superseded by the second policy when the first policy indicates the role is allowed to access the service action and the second policy indicates the role is denied to access the service action. For example, in the step of 410 in FIG. 4 where the role risk rating engine 124 of the risk rating server 120 compares the plurality of policies of the first role with respect to each of the one or more service actions to determine whether the probe fails or passes the service action, a first policy of the plurality of policies associated with the first role may indicate the first role has a permission to access a service action, whereas a second policy of the plurality of policies may indicate the first role is not permitted to access that service action. In this scenario, the role risk rating engine 124 supersedes the first policy of the plurality of policies associated with the first role by the second policy of the plurality of policies. That is, the role risk rating engine 124 determines that the first role is not permitted to access that service action.

In step 515, when the "YES" branch is selected, the role risk rating engine 124 determines that the probe passes the service action. Accordingly, the risk score of the service action is not summed into the total risk score of the probe.

If the "NO" branch is selected, in step 520, the role risk rating engine 124 checks the first policy against a third policy of the plurality of policies with respect to the service action to determine whether the first policy can be superseded by the third policy.

In step 525, whether the first policy can be superseded by the third policy is determined by the role risk rating engine 124. The first policy can be superseded by the third policy when the first policy indicates the role is allowed to access the service action and the third policy indicates the role is denied to access the service action. When the "YES" branch is selected, the role risk rating engine 124 determines that the probe passes the service action. Accordingly, the role risk rating engine 124 performs the step 515 in which the risk score of the service action is not summed into the total risk score of the probe. When the "NO" branch is selected, the role risk rating engine 124 continues to check the first policy against a next policy of the plurality of policies with respect to the service action to determine whether the first policy can be superseded by the next policy. The role risk rating engine 124 may iterate through the remaining policies of the plurality policies (as indicated the dotted line 526) until the last policy of the plurality of policies, as in step 530. That is, the above steps can be repeated until the last policy of the plurality policies.

In step 530, the role risk rating engine 124 checks the first policy against a last policy of the plurality of policies with respect to the service action to determine whether the first policy can be superseded by the last policy. For example, the plurality of policies may comprise 10 policies, and the last policy herein refers to the 10$^{th}$ policy.

In step 535, whether the first policy can be superseded by the last policy is determined by the role risk rating engine 124. The first policy can be superseded by the last policy when the first policy indicates the role is allowed to access the service action and the last policy indicates the role is denied to access the service action. When the "YES" branch is selected, the role risk rating engine 124 determines that the probe passes the service action. Accordingly, the role risk rating engine 124 performs the step 515 in which the risk score of the service action is not summed into the total risk score of the probe. When the "NO" branch is selected, the role risk rating engine 124 determines each of the plurality of policies allows the role to access the service action. Because all of the plurality of policies have been checked and each of the plurality of policies allows the role to access the service action, in step 540, the role risk rating engine 124 can sum the risk score of the service action into the total risk score of the probe.

FIG. 6 illustrates an example embodiment of determining a risk rating for a role. In this example, a role is attached to more than one policies, specifically three policies: ExamplePolicy 1, ExamplePolicy 2 and ExamplePolicy 3. A total of eight probes are used in this example.

The ExamplePolicy1 may fail all eight probes and has access to all of those probes' service actions with the maximum risk score of those service actions. Probe one may check a large amount of service actions associated with it and has a score of, for example, 445 if it fails all of the large amount of service actions; probe two may check only two service actions and has a score of, for example, 18 if it fails those two service actions; and so on for a total service actions risk score of, for example, 999 for the eight probes.

Similarly, ExamplePolicy2 may fail the first four probes but pass the next four probes. A total service actions risk score of, for example, 645 for the eight probes may be obtained under the ExamplePolicy2.

Also similarly, ExamplePolicy3 may fail only the first two probes and pass the others. A total service actions risk score of, for example, 463 for the eight probes may be obtained under the ExamplePolicy 3.

Because ExamplePolicy3 passes the last six probes, those DENY actions supersede the last six ALLOW actions of ExamplePolicy1 and the last four ALLOW actions of ExamplePolicy2. So the role only has access to the service actions of ExamplePolicy3 with the total service actions risk score of 463 (445 (failed probe one)+18 (failed probe two)=463). The method disclosed herein then divides the final role score 463 by the maximum score of 999 to get approximately a number 0.4634 (463/999). It multiplies that number by 100 and rounds it to get a final score of 46 out of 100 for the role. The role/the final score may then get a yellow logo next to it to determine that the role has a moderate risk.

FIG. 6 illustrates a table diagram 600 summarizing the eight probe results under the three policies in the above specific example. In the table diagram 600, "F" indicates that a policy fails a probe; and "P" indicates that a policy passes a probe. As shown in FIG. 6 according to the above specific example, the ExamplePolicy1 fails all the eight probes; the ExamplePolicy2 fails the first four probes but passes the next four probes; and the ExamplePolicy3 fails only the first two probes and pass the others (the next 6 probes).

Figure 7:
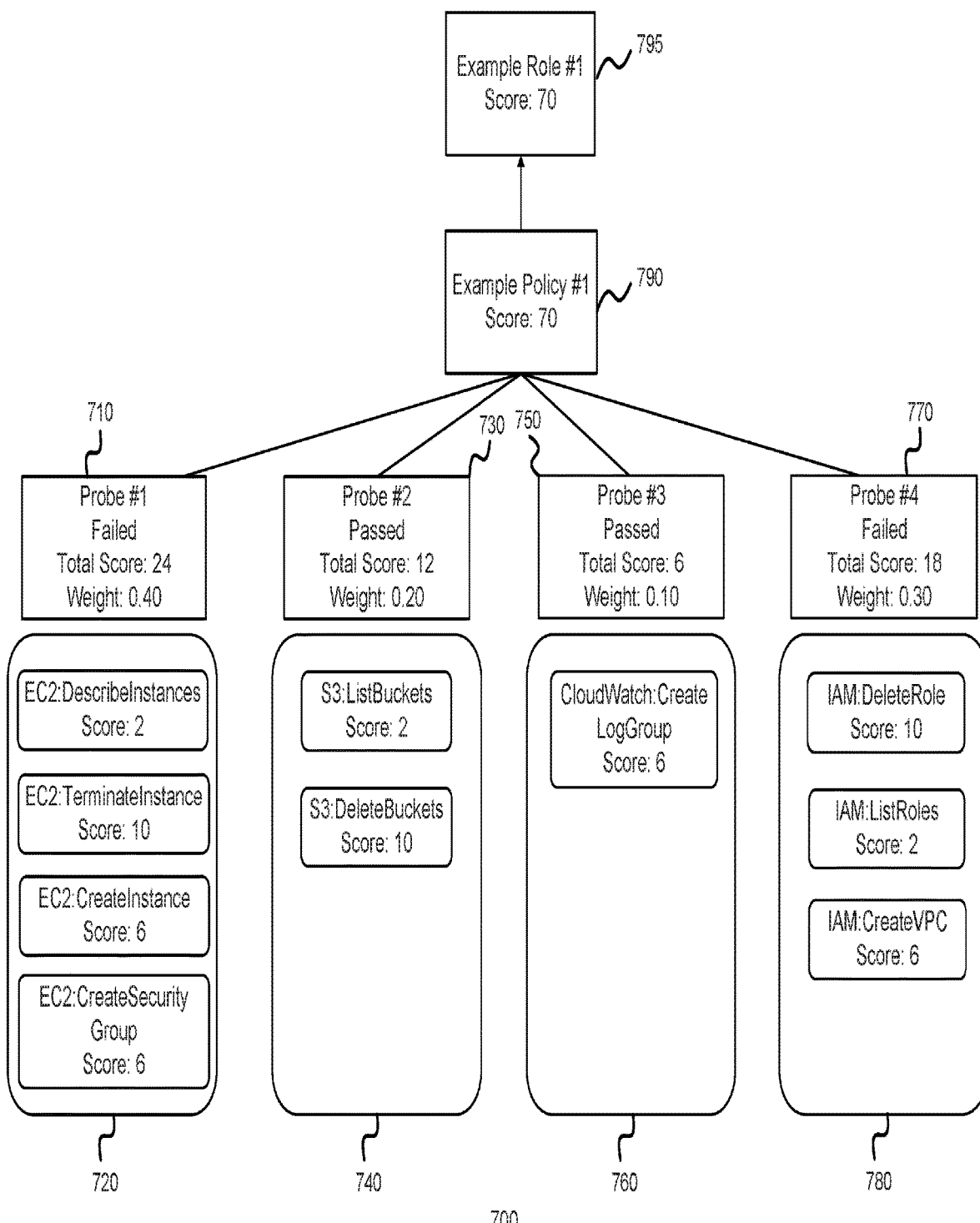
FIG. 7 is a diagram illustrating an example of determining a risk rating for a role of a cloud computing platform according to an example embodiment.

To further facilitate the description of determining a risk rating for a role, another specific example is provided herein in FIG. 7. In this specific example, a role is attached to only one policy, and a total of four probes are used. FIG. 7 illustrates an example diagram 700 of determining a risk rating for a role with one policy and four probes. This example does not take into account multiple policies and how one policy's probe scores may supersede the other and is simplified for ease of understanding. In the diagram 700, the role is referred as Example Role #1, the one policy is referred to as Example Policy #1, and the four probes are referred to as probe #1, probe #2, probe #3, and probe #4. The diagram 700 may be implemented in the system 100 of FIG. 1. FIG. 7 may reference the same or similar components as those illustrated in FIGS. 1-6, including a user device, a risk rating server, a database, and a cloud computing server.

In blocks 710 and 720, the probe #1 checks a total of four service actions with a total risk score 24 of the four service actions: EC2:DescribeInstances with a risk score of 2; EC2:TerminateInstance with a risk score of 10; EC2:CreateInstance with a risk score of 6; and EC2:CreateSecurity Group with a risk score of 6 (the total risk score of the four service actions: 2+10+6+6=24). Since the Example Policy #1 allows the Example Role #1 to access all of the four service actions, the probe #1 fails all these four service actions. Thus, the total risk score for the probe #1 is determined to be 24.

In blocks 730 and 740, the probe #2 checks a total of two service actions with a total risk score 12 of the two service actions: S3:ListBuckets with a risk score of 2; and S3:DeleteBuckets with a risk score of 10 (the total risk score of the two service actions: 2+10=12). Since the Example Policy #1 does not allow the Example Role #1 to access either of the two service actions, the probe #2 passes all these two service actions. Thus, the total risk score for the probe #2 is determined to be 0.

In blocks 750 and 760, the probe #3 checks a total of one service action with a total risk score 6 of the one service action: CloudWatch:CreateLogGroup with a risk score of 6 (the total risk score of the one service action: 6). Since the Example Policy #1 does not allow the Example Role #1 to access the one service action, the probe #3 passes the one service action. Thus, the total risk score for the probe #3 is determined to be 0.

In blocks 770 and 780, the probe #4 checks a total of three service actions with a total risk score 18 of the three service actions: IAM:DeleteRole with a risk score of 10; IAM:ListRoles with a risk score of 2; and IAM:Create VPC with a risk score of 6 (the total risk score of the three service actions: 10+2+6=18). Since the Example Policy #1 allows the Example Role #1 to access all of the three service actions, the probe #4 fails all these three service actions. Thus, the total risk score for the probe #3 is determined to be 18.

Accordingly, a total risk score for all the service actions checked by the four probes can be obtained by summing the total risk score of the service actions checked by each of the four probes: 24+12+6+18=60. A potential weight for each probe can thus be calculated by dividing the total risk score of the service actions checked by each of the four probes by the total risk score for all the service actions. That is, the potential weight for probe #1 is 0.40 (24/60=0.40 in block 710), the potential weight for probe #2 is 0.20 (12/60=0.20 in block 730), the potential weight for probe #3 is 0.10 (6/60=0.10 in block 750), and the potential weight for probe #4 is 0.30 (18/60=0.30 in block 770). The potential weight indicates a potential contribution of each probe toward the risk rating of the role if the policy fails all the service actions checked by each probe. This makes up the weighting of each probe, so a probe with more service actions has a potential of making up a larger portion of the overall risk score of the role. Since the policy may not fail all the service actions checked by a probe, the potential weight of the probe may not be an actual weight of the probe.

A risk score for the Example Role #1 can be determined by summing the total risk score of each of the four probes. Specifically, the risk score (42) for the Example Role #1 is the sum of the total risk score (24) of probe #1, the total risk score (0) of probe #2, the total risk score (0) of probe #3, and the total risk score (18) of probe #4 (42=24+0+0+18).

Thus, as in block 790, with respect to the Example Policy #1, a risk rating score can be determined by dividing the risk score of the Example Role #1 by the total risk score of all the service actions checked by the four probes. That is, the risk rating score with respect to the Example Policy #1 is calculated as: 42 (the risk score of the Example Role #1)/60 (the total risk score of all the service actions)=0.7. This number 0.7 multiplies 100 to get the risk rating score 70 with respect to the Example Policy #, as shown in block 790. Since there have only one policy in this example, the risk rating for the Example Role #1 is also 70, as shown in block 795.

An actual weight of each probe can also be determined by dividing the total risk score of each probe by the risk score of the role. The actual weight of each probe is an indicator of an actual contribution of each probe toward the risk rating of the role. For example, in this example, the actual weight of probe #1 is 24 (the total risk score of probe #1)/42 (the risk score of the Example Role #1), which is about 0.57; the actual weight of probe #2 is 0 (the total risk score of probe #2)/42 (the risk score of the Example Role #1), which is 0; the actual weight of probe #3 is 0 (the total risk score of probe #3)/42 (the risk score of the Example Role #1), which is 0; and the actual weight of probe #4 is 18 (the total risk score of probe #4)/42 (the risk score of the Example Role #1), which is about 0.43. As seen from this example, the potential weight of a probe can be different than the actual weight of the probe. For example, probe #1: 0.40 (the potential weight) versus 0.57 (the actual weight), probe #2: 0.20 (the potential weight) versus 0 (the actual weight), probe #3: 0.10 (the potential weight) versus 0 (the actual weight), and probe #4: 0.30 (the potential weight) versus 0.43 (the actual weight).

In some examples, exemplary procedures/methods in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the user device 110, the risk rating server 120 and/or the cloud computing server 140 or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Throughout the disclosure, reference is made to one or more data formats, such as JSON. It is understood that the present disclosure is not limited to a particular format, and includes any type of format. Exemplary other formats include, without limitation, Extensible Markup Language (XML), Standardized Generalized Markup Language (SGML), and Hypertext Markup Language (HTML).

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising a server containing a role risk rating engine, wherein the role risk rating engine is configured to:
   retrieve a plurality of polices associated with a first role;
   check, via each of a plurality of probes, one or more service actions associated with each of the plurality of probes;
   compare the plurality of policies of the first role with respect to each of the one or more service actions to determine whether the probe fails or passes the service action;
   supersede a first policy of the plurality of policies with a second policy of the plurality of policies when the first policy indicates the first role is allowed to access the service action and the second policy indicates the first role is denied to access the service action;
   determine that the probe passes the service action; and
   determine a risk rating for the first role.

2. The system of claim 1, wherein:
   the first role is selected form a plurality of roles,
   the plurality of roles are associated with each account of a plurality of cloud computing service accounts created on a cloud computing platform, and
   a plurality of policies are associated with each role of the plurality of roles.

3. The system of claim 1, wherein the role risk rating engine is configured to store the risk rating of the first role in a database.

4. The system of claim 3, wherein the role risk rating engine is configured to:
   receive via the database a query requesting the risk rating of the first role, and
   in response to the query, transmit the risk rating of the first role.

5. The system of claim 1, wherein the plurality of roles comprise at least one type of role selected from the group of a service role and a service-linked role.

6. The system of claim 1, wherein the role risk rating engine is configured to:
   in response to determine that the probe fails the service action, sum a risk score of the service action to obtain a total risk score of the probe,
   sum the total risk score of the probe for each of the plurality of probes to obtain a risk score of the first role,
   determine a total risk score of all service actions by summing a risk score of each service action of all the service actions, wherein all the service actions comprise all the one or more service actions associated with each of the plurality of probes, and
   determine the risk rating of the first role by dividing the total risk score of all the service actions by the risk score of the first role.

7. The system of claim 1, wherein the one or more service actions comprise a different number of service actions for each of the plurality of probes.

8. The system of claim 1, wherein the role risk rating engine is configured to generate a logo displayed next to the first role, the logo indicating the risk rating of the first role is one selected from the group of a low risk, a medium risk, and a high risk.

9. The system of claim 1, wherein each of the plurality of probes is weighted by the one or more service actions it checks.

10. A role risk rating method, comprising:
    retrieving, by a role risk rating engine deployed on a server, a plurality of polices associated with a first role;
    checking, by the role risk rating engine via each of a plurality of probes, one or more service actions associated with each of the plurality of probes;
    comparing, by the role risk rating engine, the plurality of policies of the first role with respect to each of the one or more service actions to determine whether the probe fails or passes the service action;
    superseding, by the role risk rating engine, a first policy of the plurality of policies with a second policy of the plurality of policies when the first policy indicates the first role is allowed to access the service action, and the second policy indicates the first role is denied to access the service action;
    determining, by the role risk rating engine, that the probe passes the service action; and
    determining, by the role risk rating engine, a risk rating for the first role.

11. The role risk rating method of 10, further comprising:
    selecting, by the role risk rating engine, the first role from a plurality of roles, wherein the plurality of roles are associated with each account of a plurality of cloud computing service accounts created on a cloud computing platform, and a plurality of policies are associated with each role of the plurality of roles.

12. The role risk rating method of 11, further comprising, listing, by the role risk rating engine, service actions of the cloud computing platform.

13. The role risk rating method of 11, wherein:
the plurality of policies determine permissions of the first role to access resources of the cloud computing platform; and
the plurality of policies comprise at least one type of policy selected from the group of identity-based policies, resource-based policies, permissions boundaries, organizations service control policies (SCPs), access control lists (ACLs), and session policies.

14. The role risk rating method of 10, wherein each role is limited to association with a maximum number of policies.

15. The role risk rating method of 10, further comprising:
receiving, by a database, a query requesting the risk rating of the first role; and
in response to the query, transmitting, by the role risk rating engine, the risk rating of the first role.

16. The role risk rating method of 10, further comprising:
summing, by the role risk rating engine, a risk score of the service action to obtain a total risk score of the probe,
summing, by the role risk rating engine, the total risk score of the probe for each of the plurality of probes to obtain a risk score of the first role,
determining, by the role risk rating engine, a total risk score of all service actions by summing a risk score of each service action of all the service actions, wherein all the service actions comprise all the one or more service actions associated with each of the plurality of probes, and
determining, by the role risk rating engine, the risk rating of the first role by dividing the total risk score of all the service actions by the risk score of the first role.

17. The role risk rating method of 16, wherein the risk score of the service action is determined by a service action risk rating engine.

18. The role risk rating method of 10, wherein the one or more service actions comprise a different number of service actions for each of the plurality of probes.

19. The role risk rating method of 10, wherein the plurality of roles comprise at least one type of role selected from the group of a service role and a service-linked role.

20. A non-transitory computer-readable storage medium having instructions stored thereon that, when executed by a computer server containing a role risk rating engine, cause the role risk rating engine to:
retrieve a plurality of polices associated with a first role;
check, via each of a plurality of probes, one or more service actions associated with each of the plurality of probes;
compare the plurality of policies of the first role with respect to each of the one or more service actions to determine whether the probe fails or passes the service action;
supersede a first policy of the plurality of policies with a second policy of the plurality of policies when the first policy indicates the first role is allowed to access the service action and the second policy indicates the first role is denied to access the service action;
determine that the probe passes the service action; and
determine a risk rating for the first role.

* * * * *